United States Patent [19]

Wudl et al.

[11] Patent Number: 4,640,748
[45] Date of Patent: Feb. 3, 1987

[54] POLYISOTHIANAPHTENE, A NEW CONDUCTING POLYMER

[75] Inventors: Fred Wudl, Santa Barbara; Masao Kobayashi, Goleta; Alan Heeger, Santa Barbara, all of Calif.

[73] Assignee: The Regents of the University of California, Berkeley, Calif.

[21] Appl. No.: 736,984

[22] Filed: May 22, 1985

Related U.S. Application Data

[63] Continuation-in-part of Ser. No. 634,805, Jul. 26, 1984, abandoned.

[30] Foreign Application Priority Data

May 31, 1984 [JP] Japan .................................. 59-109329
Jun. 15, 1984 [JP] Japan .................................. 59-121956

[51] Int. Cl.$^4$ .............................................. C25C 1/00
[52] U.S. Cl. .................... 204/59 R; 528/378; 528/379; 528/380; 528/395; 528/403; 204/72
[58] Field of Search .............................. 204/59 R, 72; 528/378–380, 395, 403

[56] References Cited

U.S. PATENT DOCUMENTS 3,574,072  4/1971  Louvar ................................. 204/72
4,461,691  7/1984  Frank ................................... 204/79

Primary Examiner—R. L. Andrews
Attorney, Agent, or Firm—Ciotti & Murashige

[57] ABSTRACT

A polymer having an isothianaphthene structure represented by the formula (Ia) and/or Ib):

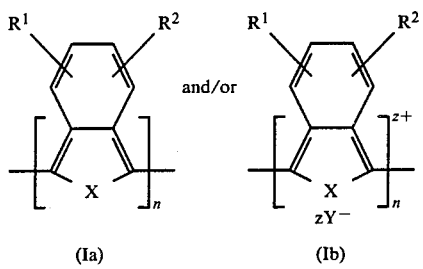

wherein $R^1$ and $R^2$ each represents a hydrogen atom or a hydrocarbon residue having 1 to 5 carbon atoms such as methyl, methoxy and thiomethyl, with the proviso that $R^1$ and $R^2$ may link together to form, along with the benzene ring, a fused ring which is naphthalene; X is sulfur, selenium or tellurium; $Y^-$ represents an anion of an electrolyte; z represents a number from 0.01 to 1 showing a ratio of the anion per mol of a monomer; and n represents a number of from 5 to 500 showing a degree of polymerization.

An electrochromic display wherein a high molecular weight conductive membrane formed on a conductive transparent base is used as a display base and an opposing electrode is arranged thereunder via a liquid electrolyte, which is characterized in that said high molecular weight conductive membrane is a polymer having an isothianaphthene structure and capable of being reversibly oxidized or reduced.

42 Claims, 9 Drawing Figures

FIG. 6 ELECTRONIC SPECTROSCOPY OF POLY (ISOTHIANAPHTHENE) AS A FUNCTION OF CHARGE. FULL LINE AT 2.5V = DISCHARGED; FULL LINE AT 3.5V, CHARGED. THE EXPERIMENT WAS CARRIED OUT IN SITU IN AN ELECTROCHEMICAL CELL USING $Li^+ ClO_4^-$ IN THF AS THE ELECTROLYTE. THE OXIDIZED POLYMER IN THIS EXAMPLE CONTAINS $ClO_4^-$ AS THE DOPANT.

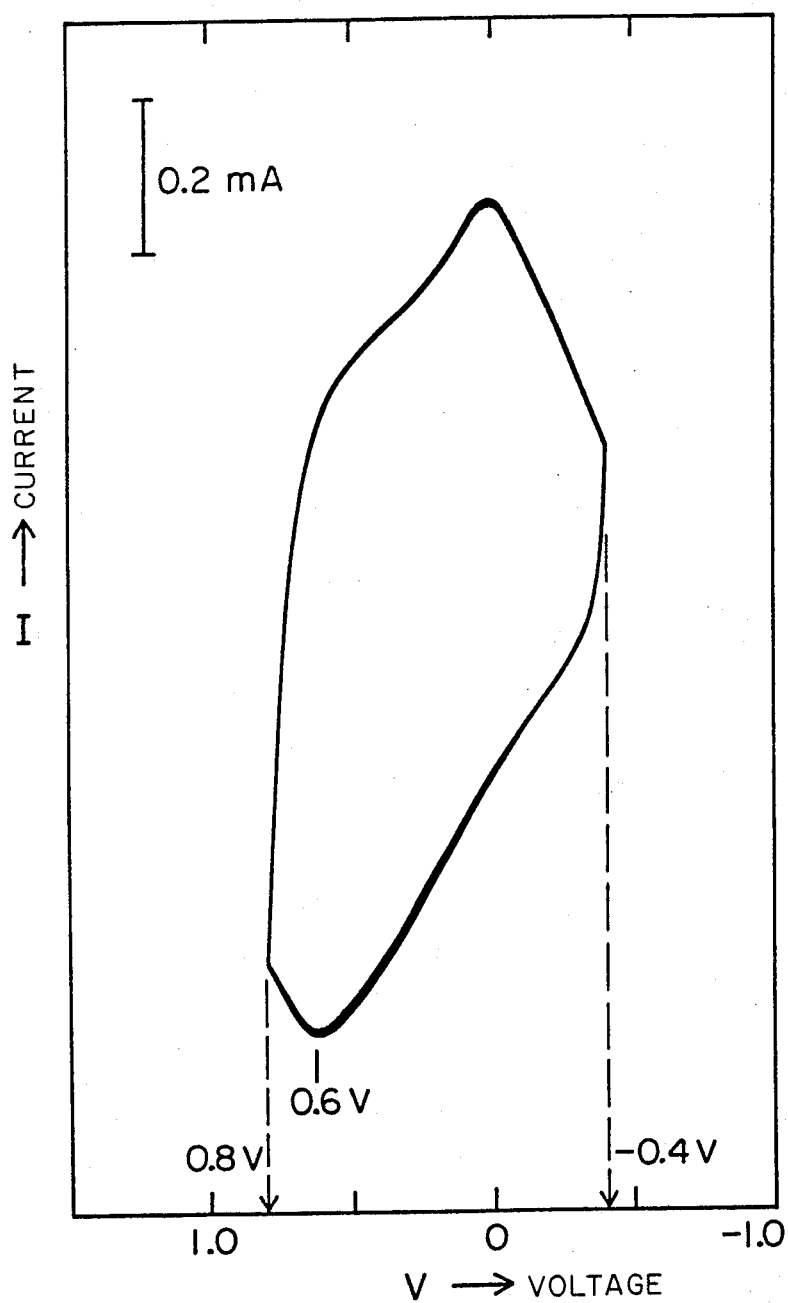
FIG. 9 ELECTROCHEMICAL REVERSIBILITY OF A POLY (ISOTHIANAPHTHENE) FILM RECORDED RELATIVE TO STANDARD CALOMEL ELECTRODE (SCE). +0.6 = YELLOW, TRANSPARENT; -0.4 V = BLUE-BLACK OPAQUE; $Li^+BF_4^-$ IN PROPYLENE CARBONATE, ELECTROLYTE. THE OXIDIZED POLYMER IN THIS EXAMPLE CONTAINS $BF_4$ AS THE DOPANT.

POLYISOTHIANAPHTENE, A NEW CONDUCTING POLYMER

This application is a continuation-in-part of application Ser. No. 634,805, July 26, 1984, now abandoned.

BACKGROUND OF THE INVENTION

With the latest remarkable developments in lightening, thinning or miniaturization of electric and electronic instruments, not only lightening, thinning or miniaturization of various conductive materials used therein but also new development of these materials per se have been desired.

Various sulfur-containing heterocyclic polymers are known including polymers from thiophene, U.S. Pat. No. 2,552,796 and U.S. Pat. No. 2,658,902; polymers from dibenzothiophene, U.S. Pat. No. 3,585,163; polymers from vinyl bithiophene, U.S. Pat. No. 3,615,384; polymers from various substituted thiophenes, U.S. Pat. No. 3,725,362; polymers from 2-bromo-8-hydroxy-5,5-dioxodibenzothiophene, U.S. Pat. No. 3,775,368; and polymers from tetrathiapentalene, U.S. Pat. No. 4,111,857.

Within the rapidly expanding field of polymeric conductors ("Proceedings of the International Conference on the Physics and Chemistry of Polymeric Conductors", J. Physique. Colloque, 1983, C-3), the poly(heterocycles) have received attention because they are easily prepared in film form and are considerably more stable to atmospheric exposure than poly(acetylene) or poly(phenylene). For use in stabilizing a semiconductor surface, see R. Noufi et al., J. Amer. Chem. Soc., 1981, Vol. 183, 184 and references therein. A further extension of this work is our recent entry into the study of poly(thiophene).

Extensive investigations on new conductive high polymers have been conducted. For example, polyacetylenes are under investigation for their possible availability as electrode materials of secondary batteries since they show excellent conductivities as high as $10^2$ to $10^3$ s/cm by doping iodine or arsenic pentafluoride (cf. Synthetic Metals, Vol. 1, No. 2, 101 (1979/1980)), and excellent charge-discharge characteristics. Further, use of polyacetylenes as materials for solar batteries is also under investigation because of their light absorption characteristics close to those of sun light. However, the polyacetylenes are disadvantageous in that they are per se susceptible to oxidation and doped polyacetylenes are extremely sensitive to humidity.

Polythiophenes are studied not only as conductive materials or as battery electrode materials because of their specific electronic structure having a conjugated structure similar to that of cis-form polyacetylenes and containing a sulfur atom, but also as electrochromic materials making use of color changes in a doped state. For example, A. M. Druy, et al reported that 2,2'-bithienyl is electrochemically polymerized to form a polymer having a color which reversibly varies from blue in an oxidized state to red in a reduced state and such a polymer is useful as an electrochromic material making use of the reversibility of the color change [cf. Journal de Physique, Vol. 44, No. 6, C3-595 (1983)].

In the light of the above-described problems, the present inventors have conducted extensive investigations and, as a result, found that a polymer having an isothianaphthene structure is a very stable compound even in air and capable of reversibly varying its color in the course of oxidation or reduction in such a stable manner as sufficient to allow repeated use thereof and it is a novel polymer that can easily show conductivities higher than $10^{-2}$ s/cm upon doping general dopants and, thus accomplished the present invention.

According to the present invention, we have now synthesized poly(isothianaphthene), a polymer of a "nonclassical" thiophene (M. P. Cava et al., Acc. Chem. Res., 1975, Vol. 8, 139). While not bound by any theory, we believe that poly(isothianaphthene) exhibits higher stability (and perhaps conductivity) than poly(thiophene) because the resonance contributors 1c and 1d shown in FIG. A are important in the stabilization of open shell species (1c) and delocalization along the backbone (1d) is responsible for high electrical conductivity.

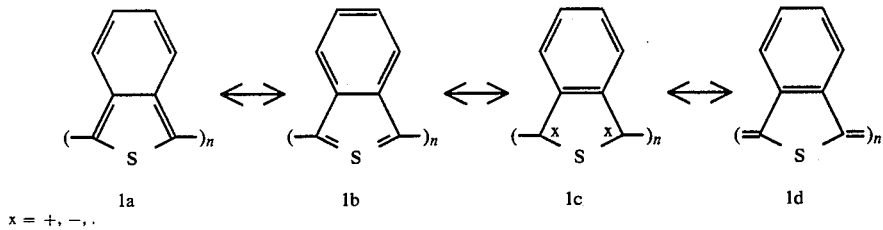

FIG. A 1a    1b    1c    1d x = +, −, ·

The analogous resonance structure (particularly the analog of 1d) would not be expected to be as important contributors to the electronic structure of poly(thiophene) as they are in the case of poly(isothianaphthene) because of the overwhelming gain in stability resulting from incorporation of the 3,4 bond of thiophene into a benzene ring.

In the case of the preparation of poly(thiophene), the two simplest methods are anodic polymerization of pure thiophene (A. Diaz, Chem. Scripta, 1981, Vol. 17, 145; G. Tourillon et al., J. Electroanal. Chem., 1982, Vol. 135, 173; C. Kossmehl et al., Makromol. Chem. Rapid Commun., 1981, Vol. 2, 551; J. Bargon, IBM, J. of Res. and Dev., 1983, Vol. 27, 330; K. Kaneto et al., J Chem. Soc. Chem. Com., 1983, 382), and chemical coupling of 2,5-dihalothiophenes (M. Kobayashi et al., Synthetic Metals, 1984, Vol. 9, 77; T. Yamamoto et al., J. Polym. Sci., Polym. Lett., 1980, Vol. 18, 9; J. Lin et al., J. Polym. Sci., Polym. Chem. Edition, 1980, Vol. 18, 2869). The former procedure provides improved materials if 2,2-dithienyl is employed as starting material (M. A. Druy, J. Physique. Colloque, 1983, Vol. C-3, 595) and the electrolysis is carried out at relatively low applied voltages ( ~3.5 V). From a practical point of view, the anodic polymerization is the more desirable; it is simple and the product appears in the form of a relatively tough, blue-black film. The chemically coupled product is of more academic interest since it is crystalline and its numberaverage molecular weight is known but it is invariably produced in powder form.

We have found that the most desirable approach to poly(isothianaphthene) is through the electrochemical coupling of isothianaphthene. (Monomer prepared according to J. A. Gadysz et al., *Tetrahedron*, 1979, Vol. 35, 2239; M. P. Cava et al., *J. Amer. Chem. Soc.*, 1959, Vol. 81, 4266; M. P. Cava et al., *J. Org. Chem.*, 1971, Vol. 36, 3932.

In this patent, we present procedures (electrochemical and chemical) for the preparation of poly(isothianaphthene). As will be shown below, electrochemical polymerization to yield the desired *unsaturated* polymer is possible only under rather specific conditions.

As is well known, liquid crystal display devices have recently been developed as display devices requiring low energy and been widely used in various applications. However, liquid crystal devices have a problem of dependence on a visual angle and also are disadvantageous in that the display is poor in sharpness; no memory function is provided; display cannot be obtained over a large surface area; and the like. In order to eliminate these disadvantages, studies have extensively been conducted on ECD devices of low energy type making use of the so-called electrochromism in which light absorption characteristics vary due to application of voltage or electric current. Electrochromic materials which can be used in the ECD devices are classified into inorganic materials and organic materials. The inorganic materials that are considered usable mainly include oxides of transition metals, a specific example is wolfram oxide, but they are limited in developable colors and also cause electrochemical elution of the membrane or deterioration of electrodes when protons are used as color-forming ions, although their response speeds are high. On the other hand, the organic materials include viologen dyes, phthalocyanine complexes, etc. However, the viologen dyes are disadvantageous in that repeated use thereof results in precipitation of insoluble substances, and the phthalocyanine complexes have a pending problem of adhesiveness between a vacuum-evaporated membrane and a base plate.

In addition, electrochromic materials which have recently been proposed include polyanilines as disclosed in A. F. Diaz, et al., *Journal of Electro-Analytical Chemistry*, Vol. 111, 111 (1980) or Yoneyama, et al., ibid., Vol. 161, 419 (1984); polypyrroles as disclosed in A. F. Diaz, et al., ibid., Vol. 101 (1983) and polythiophenes as disclosed in M. A. Druy, et al., *Journal de Physique*, Vol. 44, June, page C3-595 (1983) or Kaneto et al., *Japan Journal of Applied Physics*, Vol. 23, No. 7, page L412 (1983), but none of them has not yet been put into practical use. In particular, electrochromic materials are required to exhibit rapid response, provide high contrast, consume low power, develop excellent color tones and the like. Furthermore, an electrochromic material capable of developing a colorless tone will greatly contribute to broadening the utility of the device. However, any of these hetero-conjugated type high molecular weight materials are colored in the course of conversion from an oxidized state into a reduced state. Methods for increasing contrast by, for example, employing a white background plate, have been attacked but still not reached completion.

SUMMARY OF THE INVENTION

Briefly, the present invention comprises a polymer having an isothianaphthene structure represented by the formula (Ia) and/or (Ib):

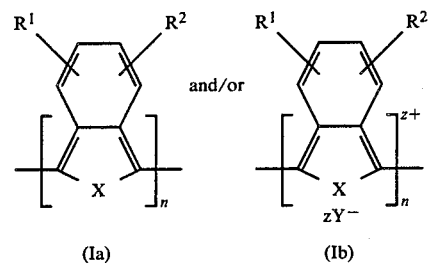

wherein $R_1$ and $R_2$ each represents a hydrogen atom or a hydrocarbon residue having 1 to 5 carbon atoms such as methyl, methoxy and thiomethyl, with the proviso that $R_1$ and $R_2$ may link together to form, along with the benzene ring, a fused ring which is naphthalene; X is sulfur, selenium or tellurium; $Y^-$ represents an anion of an electrolyte; z represents a number from 0.01 to 1 showing a ratio of the anion per mol of a monomer; and n represents a number of from 5 to 500 showing a degree of polymerization.

An electrochromic display wherein a high molecular weight conductive membrane formed on a conductive transparent base is used as a display base and an opposing electrode is arranged thereunder via a liquid electrolyte, which is characterized in that said high molecular weight conductive membrane is a polymer having an isothianaphthene structure and capable of being reversibly oxidized or reduced.

The above-described polymer can be used in the electric and electronic fields as electrodes or electrochromic display elements, or for the production of solar batteries, electric splicing, fixing and conversion devices of electromagnetic wires, or as reversible oxidation-reduction systems.

The polymers according to the present invention can easily be synthesized by various polymerization methods.

Poly(isothianaphthene) and related polymers are prepared by several different approaches. Electrochemical polymerization of isothianaphthene is strongly electrolyte dependent. Nucleophilic anions (Brhu $-$, Cl$^-$) allow formation of poly(isothianaphthene). The latter, either in a Bronsted acid ($HSO_4 \cdot nH_2O$) doped form or chloride doped form is a better conductor than polythiophene by ca. one order of magnitude.

For example, 1,3-dihydroisothianaphthene-2-oxide or a derivative thereof represented by the formula (IIa):

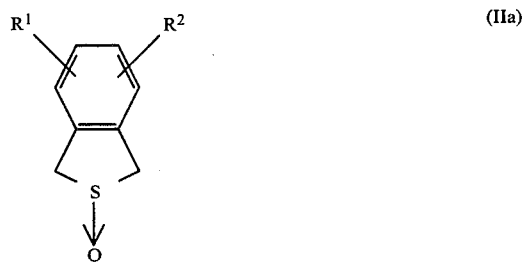

is reacted in a solvent having a dehydrating and oxidizing effect, such as concentrated sulfuric acid, to form the desired polymer.

Further, the desired polymer can also be obtained by subjecting isothianaphthene or a derivative thereof represented by the formula (IIb):

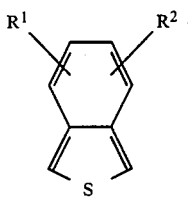

which is obtainable, for example, by dehydration and sublimation of the compound represented by the formula (IIa) on alumina, to (i) electrochemical polymerization in an aprotic solvent in the presence of an electrolyte; (ii) cationic polymerization in the presence or absence of a solvent, followed by reacting the resulting dihydro type polymer with an oxidizing agent for dehydrogenation; (iii) oxidative polymerization; or a like method.

Solvents which can be used in the above-described polymerization of monomers are not particularly restricted and can properly be selected according to the method of polymerization. In general, in the case when the isothianaphthene or its derivative represented by the formula (IIb) is electrochemically polymerized in the presence of an electrolyte, aprotic solvents, such as acetonitrile, benzonitrile, propionitrile, dioxane, tetrahydrofuran, sulforan, propylene carbonate, etc., can be used. In the case when isothianaphthene or its derivative of the formula (IIb) is cationically polymerized, solvents usable include dichloromethane, chloroform, carbon tetrachloride, dichloroethane, tetrafluoroethane, nitromethane, nitroethane, nitrobenzene, carbon disulfide, etc. In the case when the dihydroisothianaphthene-2-oxide or its derivative of the formula (IIa) is dehydration-polymerization, solvents such as concentrated sulfuric acid and polyphosphoric acid can be used. Further, when the isothianaphthene or its derivative of the formula (IIb) is subjected to oxidative addition polymerization, a combination of the solvents used in the cationic polymerization and Friedel-Crafts catalysts can be used.

Polymerizaton temperatures which can be used in the above-described polymerization of monomers can be determined according to the respective polumerization methods and are not particularly critical, but it is generally desirable to carry out the polymerization at temperatures ranging from −80° to 200° C. The poylmerization time can be determined depending on the method and temperature of polymerization, the structure of monomers, etc., but it is usuaUy preferable to conduct polymerization for a period of from O.25 hours to 200 hours. The above-described monomer compounds represented by the formulae (IIa) and (IIb) can be synthesized according to known processes, for example the processes described in M. P. Cava, et al., *Journal of American Chemical Society* VoL 81 4266 (1959) and M. P. Cava, et al., *Journal of Organic Chemistry*, Vol. 36, No. 25, 3932 (1971). Further, in order to increase yields of 1,3-dihydroisothianaphthene, a method of using solubized lithium sulfide which can be obtained by reacting lithium triethyl borohydride with sulfur is proposed in J. A. Gradysz, et al., *Tetrahedron Letters*, Vol. 35, 2329 (1979).

The invention also includes the preparation of this novel polymer.

It is an object of our invention to provide a novel polymer.

It is a more particular object of this invention to provide a novel electrically conductive polymer.

It is also an object of this invention to provide novel means for obtaining novel polyisothianaphthene-type polymers.

These and other objects and advantages of our invention will be apparent from the more detailed description which follows.

DESCRIPTION OF THE PREFERRED EMBODIMENTS

Turning to the Drawings:

FIG. 9 shows the reversible electrochemical doping of poly(isothianaphthene). Thus, using aluminum as one electrode (with a standard calomel reference electrode), the poly(isothianaphthene) as the other electrode, and a propylene carbonate solution of lithium fluoroborate as the electrolyte, it can be seen that the polymers of this invention are useful as battery electrodes.

Figure 1:
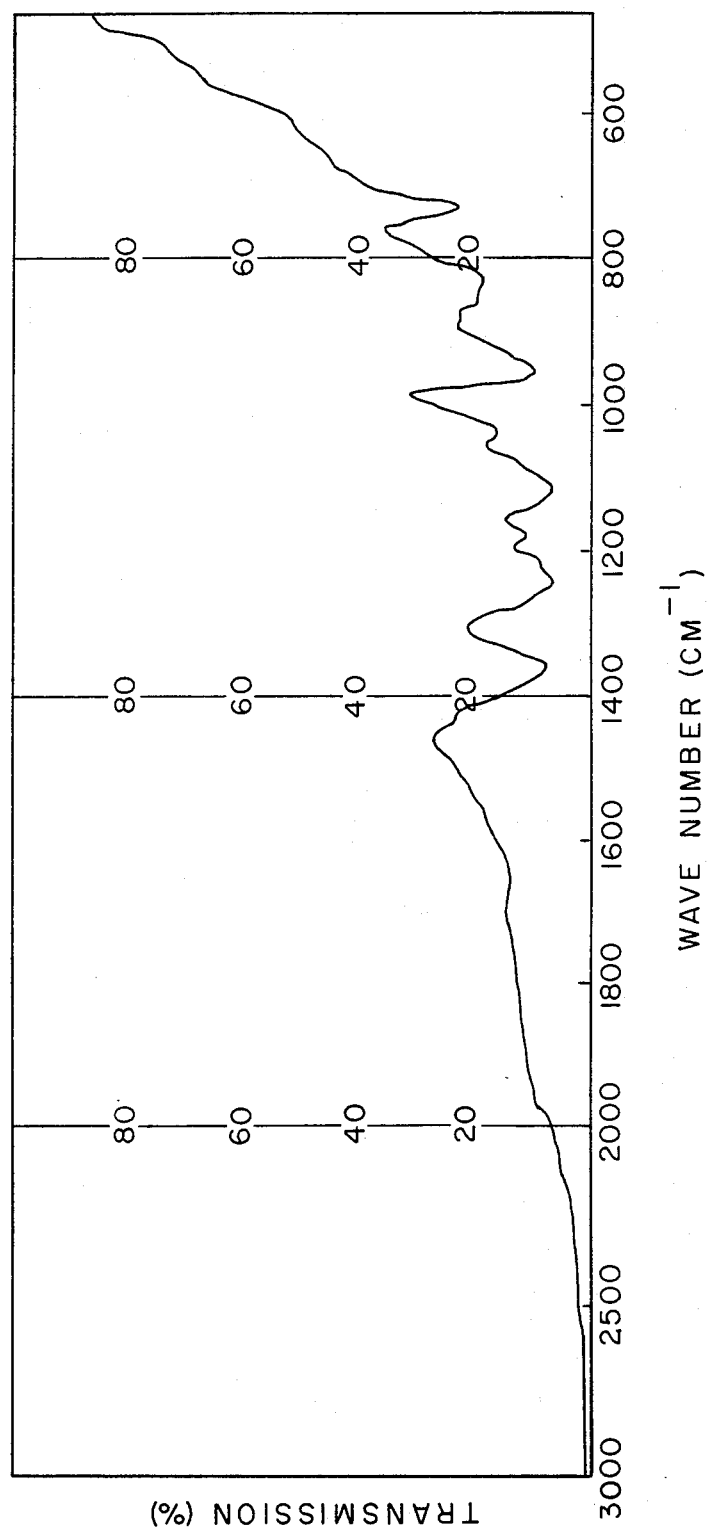
FIG. 1 is an infrared absorption spectrum of the polymer prepared in Example I.

The experiment of FIG. 9 also demonstrates the electrochromic characteristics of the novel polymers of this invention.

The thus obtained polymers according to the present invention have an entirely novel structure, and can not only exhibit markedly high conductivity through coping but also repeatedly perform electrochemical oxidation-reduction reaction while assuming inherent colors in the respective states. Moreover, the polyisothianaphthene of this invention is a particularly interesting polymer, for its transparency is not lost even in a further oxidized state. Therefore, the polymers having an isothianaphthene structure according to the present invention are greatly useful in the electric and electronic industries, for example, as electrodes, electrochromic display elements, solar batteries, electric splicing, fixing and conversion devices of electromagnetic wires as well as reversible oxidation-reduction systems.

The present invention will now be illustrated in greater detail by way of examples, but it should be understood that these examples are not limiting the scope of the present invention. In the following examples, nuclear magnetic resonance spectra ($^1$H-NMR) were measured by means of a spectrophotometer EM-360A manufactured by Varian/Analytical Div. using TMS as an internal standard, and infrared absorption (IR) spectra were measured by means of a spectrophotometer of Model 281 manufactured by The Perkin-Elmer Corp.

EXAMPLE I

Preparation of Polyisothianaphthene by Treating 1,3-Dihydroisothianaphthene-2-Oxide in Concd. Sulfuric Acid (a) Synthesis of 1,3-Dihydroisothianaphthene-2-Oxide To 200 ml of a solution containing 1 mol/l of lithium triethyl borohydride was added 3.21 g (0.1 mol) of powderous sulfur placed in a Schlenk flask at room temperature under a nitrogen atmosphere. The reaction immediately took place, and the sulfur powder was dissolved to form a yellow suspension. This suspension became a pale yellow clear solution upon contact with a trace amount of air.

Separately, into a 2 liter-volume four-necked flask equipped with a dropping funnel, a stirrer, a thermometer and an inlet for introducing nitrogen were charged 26.4 g (0.1 mol) of o-xylylene dibromide and 1 liter of anhydrous tetrahydrofuran under a nitrogen atmosphere to form a solution. While stirring, the above prepared tetrahydrofuran solution of lithium sulfide was added thereto dropwise at room temperature over a period of 1.5 hours. Thereafter, the tetrahydrofuran was removed by distillation under reduced pressure and the residue was further distilled to obtain 10.9 g (yield: 80%) of colorless 1,3-dihydroisothianaphthene having a boiling point of 74°–76° C./3 mmHg. The IR spectrum of the product showed absorptions based on the phenyl group at 3060, 3026, 1582 and 1485 cm$^{-1}$; absorption based on the methylene group at 2910, 2840 and 1450 cm$^{-1}$; absorption based on in-plane deformation of 1,2-substituted phenyl at 1195 cm$^{-1}$; absorption of o-substituted phenyl at 760 cm$^{-1}$; and absorption of sulfide at 740 cm$^{-1}$. The results of NMR spectrum ($^1$H-NMR) measurement in CDCl$_3$ with TMS as an internal standard are as follows: 4.22 (s, 4H); 7.20 (s, 4H).

This compound was very labile and changed from yellow to black even when preserved under light-screening and sealing.

Then, the thus obtained 1,3-dihydroisothianaphthene was added to 450 ml of a previously prepared 50% methanol aqueous solution having dissolved therein 18.6 g (0.086 mol) of sodium metaiodate, and the mixture was stirred at room temperature for 12 hours. The formed precipitate was separated by filtration. The filter cake was washed with 50 ml of methanol, and the washing and the filtrate were combined and concentrated under reduced pressure. The thus formed yellowish white solid was recrystallized from ethyl acetate-cyclohexane to obtain slightly yellow-tinged crystals having a melting point of 87°–89° C.

The resulting crystals were further recrystallized from ethyl acetate-cyclohexane to obtain crystals having a melting point of 90° to 91° C. The IR spectrum of the crystals showed strong absorption of sulfoxide at 1035 cm$^{-1}$ in addition to the absorptions of isothianaphthene, and the absorption of sulfide at 740 cm$^{-1}$ disappeared. The 1H-NMR spectrum measured in CDCl$_3$ with TMS as an internal standard were as follows: 4.65 (s, 4H); 7.20 (s, 4H).

Elementary Analysis for C$_8$H$_8$SO: Calcd. (%): C 63.16; H 5.26; S 21.05.
Found (%): C 63.08; H 5.15; S 20.87.

(b) Synthesis of Polyisothianaphthene from 1,3-Dihydroisothianaphthene-2-Oxide (IIa, $R^1 = R^2 = H$)

Five hundreds milligrams (3.29 mmol) of 1,3-dihydroisothianaphthene-2-oxide was added to 1 ml of concentrated sulfuric acid and the reaction system immediately turned dark red. The mixture was allowed to stand at room temperature for 70 hours, and the substantially solidified system was poured into 400 ml of methanol. The formed brown precipitate was separated by centrifugation, thoroughly washed with water and vacuum dried at 60° C. over night. The resulting polymer was placed in a Soxhlet's extractor and extracted successively with methylene chloride and chlorobenzene for 12 hours, respectively, to obtain 203 mg of a chlorobenzene insoluble matter. The IR spectrum of the resulting polymer were as shown in FIG. 1. The results of the elementary analysis were C: 67.26%; H: 3.12%; and S: 23.59% and in fairly agreement with calculated values (C: 67.19%; H: 3.32%; S: 23.54%) on the assumption that the repeating unit had the following structure:

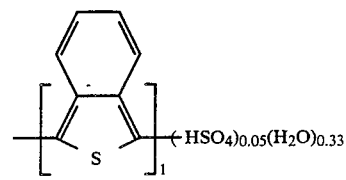

The electric conductivity ($\delta_{RT}$) of the polymer at room temperature was measured by the use of a 4-terminal network conductivity measuring cell and was found to be $2 \times 10^{-2}$ s/cm.

EXAMPLE II

Preparation of Polyisothianaphthene by Oxidation of Polydihydroisothianaphthene Obtained by Cationic Polymerization of Isothianaphthene with Oxidizing Agent (a) Synthesis of Isothianaphthene (IIb, $R^1 = R^2 = H$)

Figure 2:
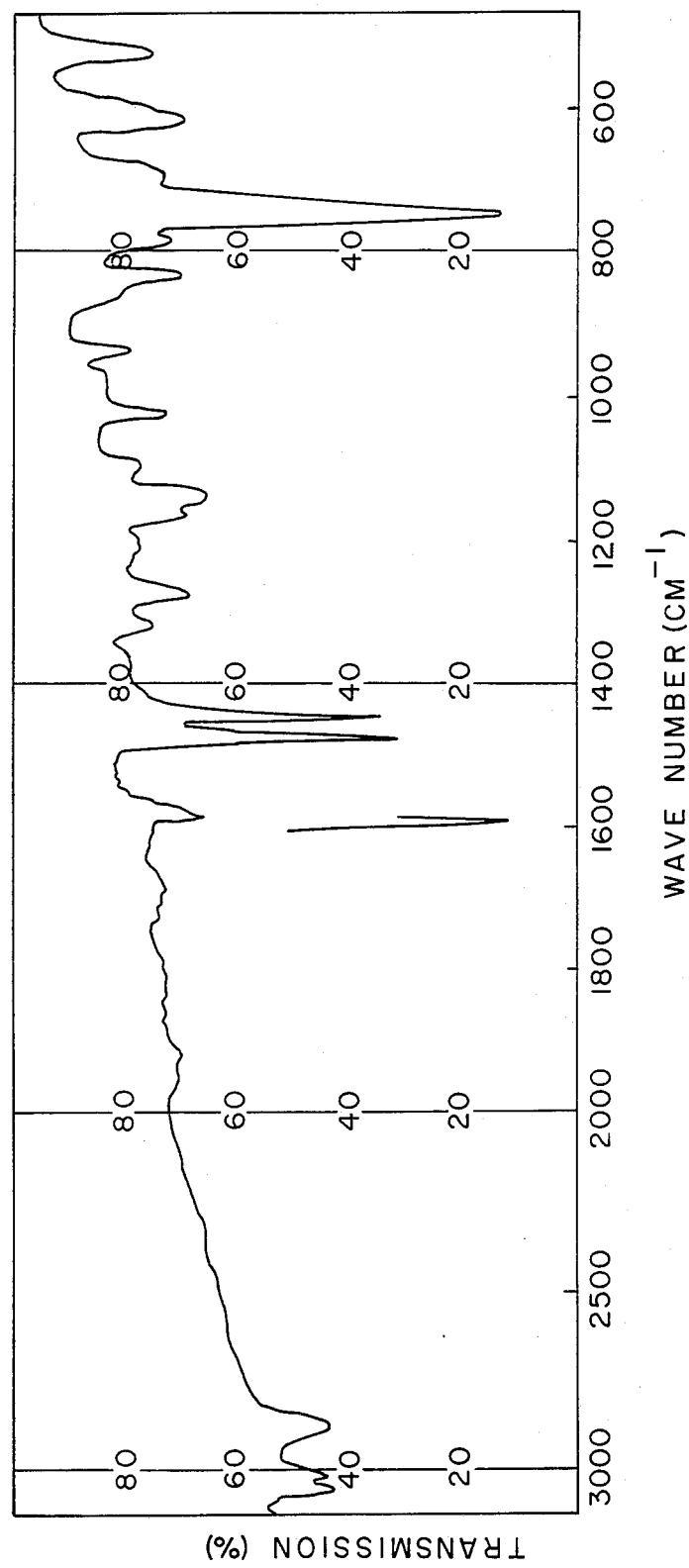
FIG. 2 is an infrared absorption spectrum of the polymer prepared in Example II.
Figure 3:
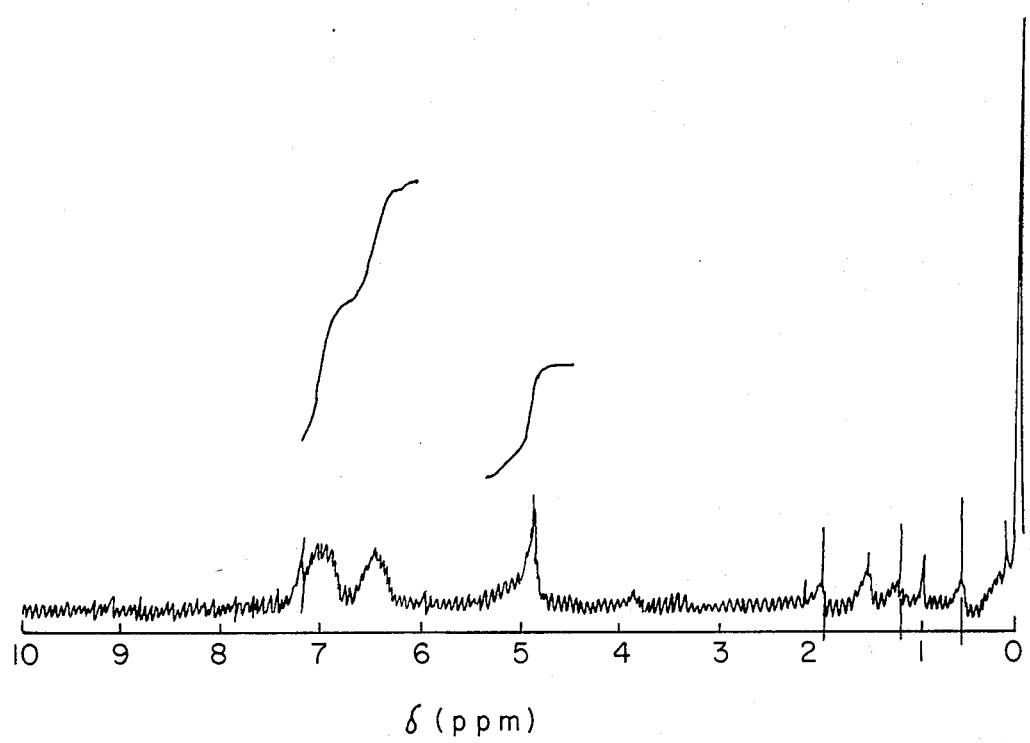
FIG. 3 is an NMR spectrum of the polymer prepared in Example II.

Three hundreds milligrams (1.97 mmol) of 1,3-dihydroisothianaphthene-2-oxide synthesized according to Example 1(a) and 450 mg (4.41 mmol) of neutral alumina were thoroughly pulverized and mixed in a mortar, then put in a sublimation apparatus and heated on an oil bath under reduced pressure. There was obtained 250 mg (1.87 mmol) of isothianaphthene as white needle crystals at the bottom of a cooling part of the sublimation apparatus. Immediately thereafter, the resulting monomer was dissolved in 5 ml of purified and degassed methylene chloride, and 10 mg of trifluoroacetic acid was added thereto, followed by allowing the mixture to stand overnight. When the reaction mixture was poured into 50 ml of methanol, a white precipitate was obtained. The resulting polymer was soluble in chloroform, chlorobenzene, tetrahydrofuran and N,N-dimethylformamide. The IR and $^1$H-NMR spectra of the polymer were as shown in FIGS. 2 and 3, respectively.

Further, it was confirmed that the polymer had a molecular weight of 2000 as converted to polystyrene by gel-permeation chromatography (Varian 5000) of a tetrahydrofuran solution of the polymer.

The electric conductivity ($\delta_{RT}$) of the polymer at room temperature as measured in the same manner as in Example 1 was $10^{-8}$ s/cm or less.

Elementary Analysis for ($C_8H_6S$):
Calcd. (%): C 71.64; H 4.48; S 23.88.
Found (%): C 71.27; H 4.54; S 23.96.

The same procedures as described above were repeated except for using methanesulfonic acid as a polymerization initiator in place of trifluoroacetic acid to obtain a polymer. The IR spectrum of the resulting polymer were in complete agreement with that of FIG. 2.

Figure 4:
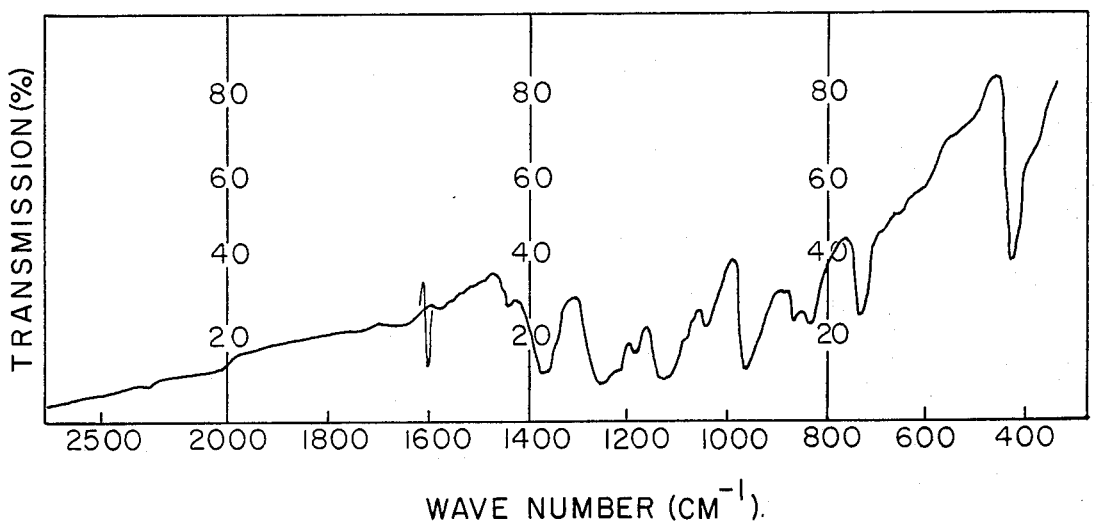
FIG. 4 is an infrared absorption spectrum of the polymer obtained by treating the polymer first prepared in Example II with chloranil.

These polymers were dissolved in 5 ml of chlorobenzene and treated with double the molar amount of chloranil to form a black precipitate. The resulting polymer had an electric conductivity ($\delta_{RT}$) of $9 \times 10^{-2}$ s/cm at room temperature, and the electric conductivity of an iodine-doped polymer was $9 \times 10^{-1}$ s/cm. IR spectrum of the polymer is shown in FIG. 4. The polymer after iodine-doping did not undergo change of conductivity even when left to stand in air at room temperature for 1 week.

In the same manner as described above except for using 5 ml of chloroform in place of chlorobenzene and 1,1 times the molar amount of N-chlorosuccinimide in place of chloranil, a black polymer having entirely the same IR Spectrum as that shown in FIG. 4 was obtained. The conductivity ($\delta_{RT}$) of this polymer was found to be $2.6 \times 10^{-1}$ s/cm.

EXAMPLE III

Preparation of Polyisothianaphthene by One-Step Oxidative Polymerization of Isothianaphthene Isothianaphthene was synthesized in the same manner as described in Example 2(a). A mixture of 250 mg of isothianaphthene, 5 ml of anhydrous methylene chloride, 134 mg of anhydrous aluminum chloride and 134 mg of anhydrous cupric chloride was allowed to react at a temperature of 35 to 37° C. for 1 hour to form a black precipitate. After the reaction mixture as such was maintained at that temperature for 12 hours, the precipitate was treated with a methanol solution having been rendered acidic with hydrochloric acid, thoroughly washed with water and dried. The dried polymer was extracted successively with hot methanol, hot methylene chloride and hot chlorobenzene to obtain 205 mg of a black polymer. The IR spectrum of this product was in complete agreement with FIG. 4. The electric conductivity ($\delta_{RT}$) was $2.8 \times 10^{-2}$ s/cm.

EXAMPLE IV

Preparation of Polyisothianaphthene by Electrochemical Polymerization of Isothianaphthene Electrochemical polymerization of isothianaphthene was carried out by using an electrolytic solution prepared by dissolving an electrolyte indicated in Table 1 below and isothianaphthene in a polar solvent at a prescribed concentration; a platinum plate as a sample electrode; an aluminum plate as a counter electrode; at room temperature at a constant voltage for a prescribed period of time. There was formed a polyisothianaphthene film on the platinum plate anode. The aforesaid electrolytic solution had been subjected in advance to disoxidation by bubbling dry argon gas therethrough for at least 30 minutes. The constant voltage during the polymerization was 1.5 V.

The thus formed film was thoroughly washed successively with acetonitrile and methylene chloride and dried in vacuo. The electrical of the film properties were determined, and the results obtained are shown in Table 1 below.

TABLE 1

ELECTROCHEMICAL POLYMERIZATION OF ISOTHIANAPHTHENE

| Example No. | Concentration of Isothianaphthene (mmol/l) | Electrolyte (Concentration) (mmol/l) | Solvent (Amount) (ml) | Current Application Time (hr) | Color | Property of Polymer $\sigma_{RT}$ (s/cm) | $\sigma_{RT}$ After Iodine-Doping (s/cm) |
|---|---|---|---|---|---|---|---|
| IV-1 | 78.8 | φ$_4$AsCl (168) | CH$_3$CN (25) | 2 | blackish blue | $4.5 \times 10^{-2}$ | $6.8 \times 10^{-1}$ |
| IV-2 | 78.8 | φ$_4$PCl (80) | CH$_3$CN (25) | 2 | blackish blue | — | — |
| IV-3 | 78.8 | φ$_4$AsCl (168) | φCN (25) | 2 | blackish blue | — | — |
| IV-4 | 78.8 | Bu$_4$NBr (168) | φCN (25) | 2 | blackish blue | $4 \times 10^{-1}$ | — |
| IV-5 | 180 | LiBr (300) | CH$_3$CN (25) | 1 | blackish blue | — | — |
| IV-6 | 180 | Bu$_4$NBr (300) | CH$_3$CN (25) | 1 | blackish blue | $4 \times 10^{-1}$ | — |
| IV-7 | 180 | Bu$_4$NPF$_6$ (300) | CH$_3$CN (25) | 1 | slightly purplish blue | — | — |
| IV-8 | 180 | Bu$_4$NClO$_4$ (300) | CH$_3$CN (25) | 1 | slightly purplish | — | — |

TABLE 1-continued

ELECTROCHEMICAL POLYMERIZATION OF ISOTHIANAPHTHENE

| Example No. | Concentration of Isothianaphthene (mmol/l) | Electrolyte (Concentration) (mmol/l) | Solvent (Amount) (ml) | Current Application Time (hr) | Color | Property of Polymer $\sigma_{RT}$ (s/cm) | $\sigma_{RT}$ After Iodine-Doping (s/cm) |
|---|---|---|---|---|---|---|---|
| | | | | | blue | | |

Note:
φ$_4$AsCl: Tetraphenylarsonium chloride
φ$_4$PCl: Tetraphenylphosphonium chloride
Bu$_4$NBr: Tetra(n-butyl)ammonium bromide
LiBr: Lithium bromide
Bu$_4$NPF$_6$: Tetra(n-butyl)ammonium hexafluorophosphate
Bu$_4$NClO$_4$: Tetra(n-butyl)ammonium perchlorate
CH$_3$CN: Acetonitrile
φCN: Benzonitrile

EXAMPLE V

Use of Polyisothianaphthene as Electrochemical Display Element, Battery Material, etc.

Test of Use as Electrochromic Material

The same procedures as in Example IV-2 were repeated but using a conductive glass on which indium oxide had been vacuum evaporated as an anode in place of platinum plate used in Example IV-2, thereby to electrochemically precipitate a polymer on the conductive glass. The cyclic voltammetry was performed using the above obtained polymer-coated conductive glass as a working electrode; a platinum wire as a counter electrode and a standard calomel electrode as a reference electrode; by the use of a polarographic analyzer (174A model manufactured by EG & G Co.) in an acetonitrile solution containing 292 mmol/l of tetrabutylammonium perchlorate at room temperature. The applied voltage sweep rate was 20 mV/sec, and the range of sweep was from +1.0 V to −0.7 V (vs. standard calomel electrode). The results obtained are shown in FIG. 5.

Figure 5:
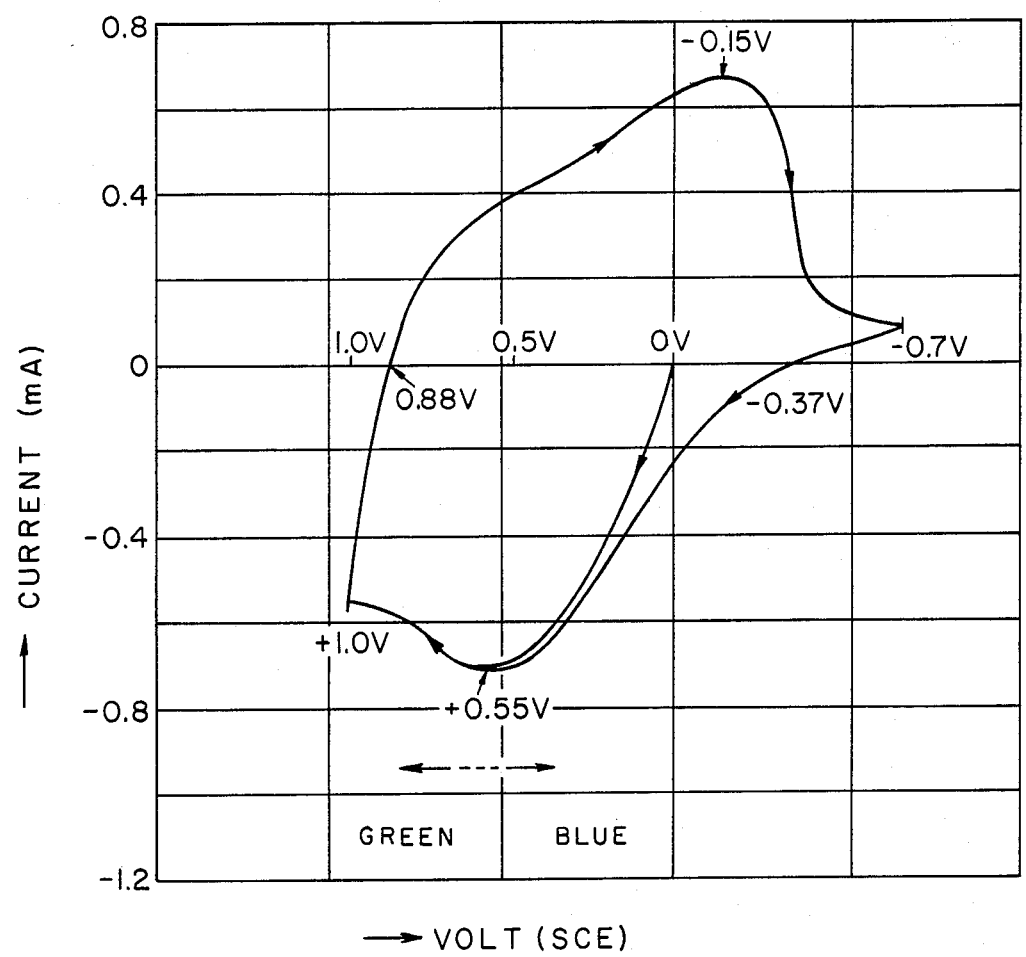
FIG. 5 is a chart illustrating the results of polarographic analysis of the polymer obtained in Test of Use as Electrochromic Material in Example V.

As is shown in FIG. 5, the polymer showed an oxidation peak and a reduction peak at +0.58 V and −0.15 V, respectively, and had a color varying from deep blue at a voltage range of from −0.7 V to +0.6 V to extremely transparent light green at a voltage range of from +0.6 V to +1.0 V. These results indicate that the deep blue state is a neutral state of the polymer and that the polymer has a green color of high transparency in the oxidized and doped state.

Test of Use as Battery

The polyisothianaphthene film obtained in Example IV-1 was cut into pieces of 1 cm wide and 3 cm long. One end of the sample piece was adhered to a platinum wire using a conductive adhesive, and this sample piece was arranged on each of both surfaces of a lithium foil of the same size via a 1 mm thick porous polypropylene partitioning membrane in such a manner that an electrolytic solution could sufficiently impregnated thereinto. The system was then dipped in a propylene carbonate solution containing 0.5 mol/l of lithium perchlorate to a depth of 2 cm. The thus prepared battery wherein poly(isothianaphthene) was used as a cathode and the lithium foil as an anode was charged at a charging current of 2.0 mA/cm$^2$ for 30 minutes in an argon atmosphere. Completion of charging was immediately followed by discharging at a discharging current of 2.0 mA/cm$^2$, and at the time when the voltage of the battery fell to 1 V, charging was again performed under the same conditions as described above. When the charge-discharge operation was repeated in this manner, 590 times of repetition were recorded until the charge-discharge efficiency was reduced to 50%. Further, the charge-discharge efficiency on the 5th repetition was 99%. Furthermore, after 48-hour standing of a charged battery, the self discharging rate was 3.2%.

EXAMPLE VI

Poly(dihydroisothianaphthene) By Electrochemical Polymerization

The monomer isothianaphthene was prepared by the procedure described in the literature (J. A. Gladysz et al., Tetrahedron, 1979, Vol. 35, 2239; M. P. Cava et al., J. Amer. Chem. Soc., 959, Vol. 81, 4266; M. P. Cava et al., J. Org. Chem., 1971, Vol. 36, 3932), and used directly after preparation. The polymer poly(dihydroisothianaphthene) was obtained by electrochemical oxidation of this monomer in a two-electrode, separate compartment cell. Platinum sheet was used as the anode, and oxidized graphite was used as the cathode. The clear colorless solution used for the polymerization contained 0.23 M of isothianaphthene with 0.30 M electrolyte, Bu$_4$NPF$_6$, in acetonitrile. The acetonitrile (Mallinckrodt) was used directly without further purification. A series of 1.5 V batteries was used as the power supply.

All experiments were carried out under dry N$_2$. When 4.5 V was connected across this cell, a lot of white powder appeared near the anode instantly. The batteries were disconnected after ten minutes. This white powder, poly(dihydroisothianaphthene), was separated by suction filtration, washed with acetonitrile and diethylether, and dried under vacuum. The resulting solid was purified for elemental analysis by reprecipitation from tetrahydrofuran-H$_2$O.

When a freshly prepared sample of isothianaphthene was electrolyzed in the anode compartment of an H cell using Bu$_4$NClO$_4$ or Bu$_4$NBF$_4$ as supporting electrolyte and tin oxide coated glass (TOG) as anode, a copious amount of a white precipitate ("WP") filled the anode compartment. Upon careful observation it was discovered that the anode was first (instantaneously) covered with a very thin blue film and immediately thereafter formation of WP commences. Appearance of WP was independent of electrode material, solvent, or temperature. Isolation, characterization (ir, el. anal.) and chemical manipulation (see below) proved WP to be poly(-dihydroisothianaphthene). It should be noted that thiophene produces partially oxidized ("doped") polymer films under the above conditions while isothianaphthene, after deposition of an extremely thin blue film (presumably doped poly(isothianaphthene)), is transformed to poly(dihydroisothianaphthene). The only reasonable explanation for this surprising observation was that poly(isothianaphthene) acts as an initiator of cationic polymerization of isothianaphthene. In order to test this hypothesis we exposed freshly prepared solutions of isothianaphthene to the usual catalysts for cationic initiation (Bronsted and Lewis acids) and found that all polymerized isothianaphthene to different degrees. But by far the most interesting result was with sulfuric acid in methylene chloride. Under these conditions, isothianaphthene was converted to a blue-black powder form of poly(isothianaphthene) doped with hydrated sulfuric acid. Clearly the acid acted not only as catalyst but also as oxidizing agent. A reassuring "convergent" test for the above hypothesis was that the product of chloranyl dehydrogenation was poly(dihydroisothianaphthene) and the product of $H_2SO_4$ polymerization exhibited identical infrared spectra. The only reasonable explanation for this observation is that the infrared spectra of doped poly(isothianaphthene) are dominated by the absorptions due to the conduction electrons and the absorptions due to intramolecular vibrations are weak features of the spectrum. In the absence of additional control experiments, it is difficult to speculate about a specific mechanism to explain this electrolyte effect.

We reasoned that $H_2SO_4$ may convert dihydroisothianaphthene-S-oxide directly into poly(isothianaphthene). $(H_2SO_4)_x \cdot (H_2O)_y$. The addition of solid dihydroisothianaphthene-S-oxide to 98% $H_2SO_4$ did in fact produce the desired partially doped poly(isothianaphthene) (cf Scheme I, below).

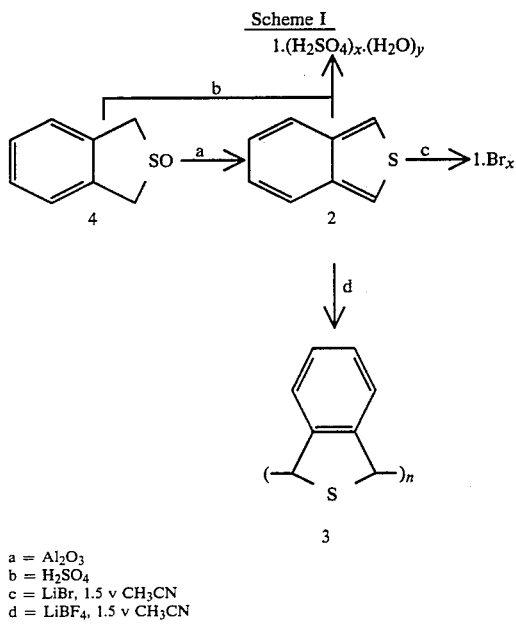

Scheme I a = $Al_2O_3$
b = $H_2SO_4$
c = LiBr, 1.5 v $CH_3CN$
d = $LiBF_4$, 1.5 v $CH_3CN$ In addition, 7,7,8,8-tetracyanoquinodimethane can be used as a catalyst for cationic polymerization. However, the product did not exhibit higher conductivity than any of the other doped poly(isothianaphthene) compounds, indicating that the acceptor is probably not involved in the conductivity of the solid. Two reasons could be advanced for that observation, the acceptor molecules are probably not stacked in small crystalline regions and/or there is complete charge transfer.

While the above results explain the nature of the process of formation of poly(dihydroisothianaphthene) and allow the discovery of a clean procedure for the chemical synthesis of poly(isothianaphthene), it still does not offer an entry to the electrochemical polymerization of isothianaphthene. This required the discovery of a method to prevent the catalysis for poly(dihydroisothianaphthene) formation by "nascent" doped poly(isothianaphthene). We found that if the reaction medium contained a species which was more nucleophilic than isothianaphthene, the propagation step would be interrupted. A test experiment which involved addition of iodide to the anode compartment prior to electrolysis failed because iodide was simply oxidized under the electrolysis conditions. However, electrolysis with LiBr, $Bu_4NBr$, or preferably $Ph_4AsCl$ produced excellent films on platinum or TOG. The only reasonable explanation for this observation is that the infrared spectra of doped poly(isothianaphthene) are dominated by the absorptions due to the conduction electrons and the absorptions due to intramolecular vibrations are weak features of the spectrum. In the absence of additional control experiments, it is difficult to speculate about a specific mechanism to explain this electrolyte effect.

Anal. Calcd. for $(C_8H_6S)$: C, 71.60; H, 4.51; S, 23.89. Found: C, 71.27; H, 4.54; S, 23.96.

$LiBF_4$ and $Bu_4NClO_4$ can be used as the electrolyte for this reaction.

According to this invention, it has been found that the metastable isothianaphthene can be polymerized to well characterizable highly conducting polymers by at least three different procedures; one of these involves the electrochemical preparation of poly(dihydroisothianaphthene) by the polymerization of isothianaphthene in the presence of nucleophilic anions. It has also been found that poly(isothianaphthene) is a better conductor than polythiophene.

EXAMPLE VII

Poly(dihydroisothianaphthene) By Chemical Cationic Polymerization

The monomer isothianaphthene (396 mg, 2.96 m.mol) was dissolved in 10 ml methylene chloride which was previously dried over $P_2O_5$. When one drop of methanesulfonic acid was added to this solution, there was an instantaneous change in the reaction mixture from colorless to red. This color became violet after 90 minutes. After removal of methylene chloride by evaporation, the residue was dissolved in tetrahydrofuran. And when this solution was poured into methanol, the polymer poly(dihydroisothianaphthene) precipitated from the solution. This was separated by centrifugation, and dried under vacuum. The infrared spectrum was identical with that of polymer poly(dihydroisothianaphthene) mentioned above.

The following Examples demonstrate the successful practice of the present invention and are not intended to be limiting of the invention.

EXAMPLE VIII

Doped Poly(isothianaphthene) By Electrochemical Polymerization

The polymerization procedure was essentially the same as that described above in Example VI for the polymer poly(dihydroisothianaphthene). The most important point was the electrolyte. When lithium bromide was used as the electrolyte, a blue film of the doped polymer poly(isothianaphthene) was grown on the anode (conducting glass) instantly after connecting a 1.5 V battery. Bu₄NBr and Ph₄AsCl can also be used as the electrolyte for this reaction.

EXAMPLE IX

Doped Poly(isothianaphthene) By Chemical Cationic Oxidative Polymerization With Sulfuric Acid Sulfuric acid (5 ml.) was added to the monomer isothianaphthene (396 mg. 2.96 m.mol). The monomer color changed from white to reddish-black instantly. When the reaction mixture was poured into 400 ml of methanol after overnight stirring, a brown powder, the doped polymer poly(isothianaphthene) precipitated from this solution. This was separated by centrifugation and extracted with methylene chloride and chlorobenzene using a Soxhlet extraction apparatus, followed by drying under vacuum. This reaction can be also carried out with a suspension of sulfuric acid in methylene chloride.

EXAMPLE X

Doped Poly(isothianaphthene) By Chemical Cationic Oxidative Polymerization With TCNQ (7,7,8,8-Tetracyanoquinodimethane)

The monomer isothianaphthene (238 mg. 1.77 m.mol) was dissolved in 5 ml methylene chloride. After a few mg of TCNQ were added to this solution, its color changed to red very slowly. After overnight stirring, this color became bluish-black. Next, more TCNQ which was double the molar quantity of the monomer isothianaphthene, was added to this solution. This was heated up to 110° C. and this temperature was kept for 1 hour. When this reaction mixture was poured into methanol, greenish-black powder precipitated from this solution. This was washed with methanol and chlorobenzene using a Soxhlet extraction apparatus, followed by drying under vacuum.

EXAMPLE XI

Poly(isothianaphthene) From Poly(dihydroisothianaphthene)

The polymer poly(dihydroisothianaphthene), which was prepared by electrochemical polymerization, was dissolved in hot chlorobenzene. This was a light-brown solution. Tetra-chloro-p-benzoquinone (Chloranyl) was added to this solution. Immediately the solution color changed to dark green. A powder precipitated from this solution by cooling. This was separated by suction filtration, washed with methanol, and dried under vacuum. All materials which were mentioned in Examples VII to XI showed identical infrared spectra.

Thus, the present invention presents three alternative routes to poly(isothianaphthene):

1. The electrochemical polymerization of isothianaphthene in the presence of nucleophilic anions;
2. The chemical polymerization of isothianaphthene or dihydroisothianaphthene-S-oxide in the presence of cationic polymerization catalysts;
3. The dehydrogenation of poly(dihydroisothianaphthene).

Preliminary results of conductivity measurements are collected in Table II. The band edge of poly(isothianaphthene) was estimated (from transmission through thin films at low doping levels) to be ~1 eV (1.1μ). This is nearly 1 eV lower than that of polythiophene (~2 eV, 620 nm)[3].

TABLE II

List of Compaction Conductivity of the Doped Polymer Poly(isothianaphthene)

| Compound | [S/cm][a] |
|---|---|
| Poly(isothianaphthene).Cl$_x$ - Example VIII | $4.0 \times 10^{-1}$ |
| Poly(isothianaphthene).(HSO$_4$)$_{0.05}$.(H$_2$O)$_{0.033}$ - Example Ib | $2.0 \times 10^{-2}$ |
| Poly(isothianaphthene).(AlCl$_4$)$_x$ - Example III | $2.8 \times 10^{-2}$ |
| Poly(isothianaphthene).(TCNQ)$_x$ - Example X | $1.5 \times 10^{-2}$ |
| Poly(isothianaphthene).(Chloranyl)$_{4x}$ - Example XI | $1.3 \times 10^{-2}$ |

[a]2-probe compaction measurement

FIG. 9 shows the reversible electrochemical doping of poly(isothianaphthene). Thus, using aluminum as one electrode (with a standard calomel reference electrode), the poly-(isothianaphthene) as the other electrode, and a propylene carbonate solution of lithium fluoroborate as the electrolyte, it can be seen that the polymers of this invention are useful as battery electrodes.

The experiment of FIG. 9 also demonstrates the electrochromic characteristics of the novel polymers of this invention.

Figure 6:
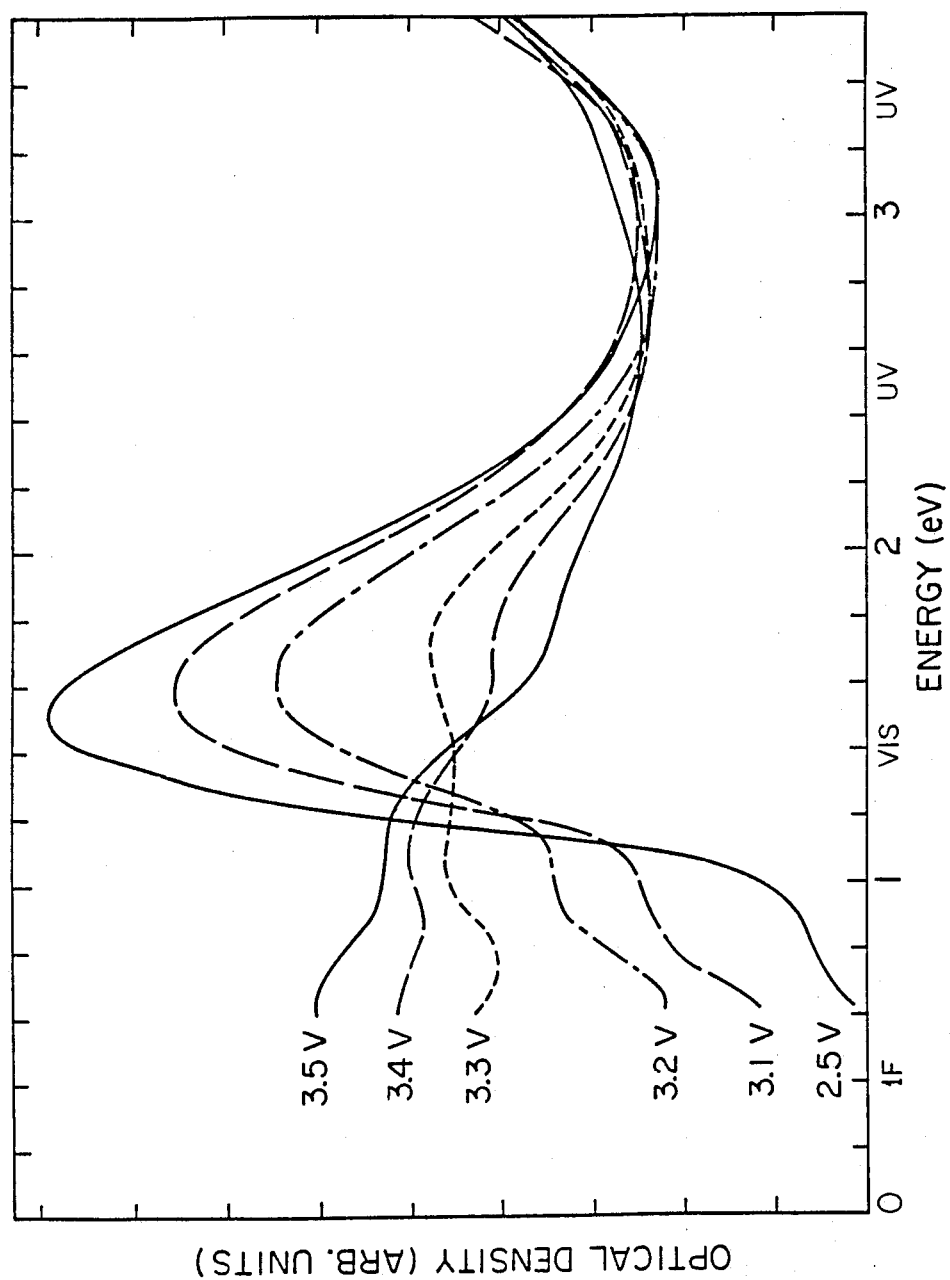
FIG. 6 is a graph showing voltage-dependence of optical absorption when the high molecular weight conductive membrane according to Example XIV was dipped in a tetrahydrofuran solution containing 0.53 mol/1 of $LiClO_4$ and Li was used as an opposing electrode.

In FIG. 6, we show the electrochromic effect; the dopant was ClO$_4^-$. The reference electrode was lithium. The Energy (eV) refers to the incident radiation, with the 0 to 1 range being in the infrared, 1 to 2 the visible, and 2 and above gradually shifting to the ultraviolet portion of the spectrum. The results shown in FIG. 6 furthermore indicate the utility of the polymers of this invention in solar energy conversion devices because the semiconductor energy gap is well matched to the solor spectrum.

The present inventors have conducted extensive investigations on electrochromic behaviors of a polymer having an isothianaphthene structure and, as a result, found that the above-described polymer is a novel electrochromic material which is rapid in response and provides a substantially colorless tone in an oxidized state, and thus accomplished the present invention. This finding is admittedly surprising because such an electrochromic material that assumes a substantially colorless tone is not hitherto known.

The electrochromic display device (ECD) according to the present invention comprises a conductive transparent base having provided thereon a high molecular weight conductive membrane and an opposing electrode arranged thereunder via a liquid electrolyte and is characterized in that said high molecular weight conductive membrane is a polymer having an isothianaphtlene structure and capable of being reversibly oxidized or reduced. The term "liquid electrolyte" herein used means a dispersion or solution of a supporting electrolyte in a solvent.

Specific Explanation of the Invention

The high molecular weight conductive membrane which can be used as an electrochromic layer according to the present invention is a polymer capable of being reversibly oxidized or reduced and having an isothianaphthene structure represented by the formula (III):

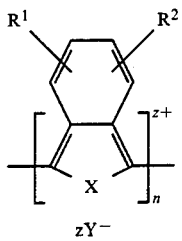

wherein $R^1$ and $R^2$ represent hydrogen or hydrocarbon having a carbon number of 1–5, X is sulfur, selenium or tellurium, $Y^-$ represents an anion, z is a value of 0–0.40 representing the ratio of anion per isothianaphthene structure unit, and n represents the degree of polymerization of 5–500, which is produced by electrochemically polymerizing isothianaphtene compound expressed by the following formula (IV):

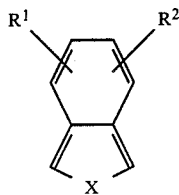

wherein $R^1$, $R^2$ and X are as defined immediately above.

Specific examples of the isothianaphthene compound represented by the formula (IV) include 1,3-isothianaphthene, 5-methyl-1,3-isothianaphthene, 5,6-dimethylisothianaphthene, 5-ethyl-1,3-isothianaphthene, 5-methyl-6-ethyl-1,3-isothianaphthene, etc.

Electrochemical polymerization of the above-described isothianaphthene compound can be carried out according to the methods generally employed for electrochemical polymerization of thiophene, pyrrole, etc. [e.g., the method described in *Solid State Communication*, Vol. 46, No. 5, 389 (1983)]. More specifically, both controlled potential electrolysis or controlled current electrolysis can be employed, and it is desirable to form a polymer membrane on a transparent base by using a conductive transparent base as a sample electrode.

The conductive transparent base which can be used in the present invention include the ones comprising a transparent insulator such as glass, polyester film, etc. having vacuum evaporated thereon indium-tin oxide, tin oxide, platinum, etc. by sputtering or a like method, which are easily available as commercial products. The polymer membrane formed by electrochemical polymerization has a thickness of from 0.03 to 30 μm, preferably 0.05 to 22 μm, more preferably 0.1 to 10 μm. The membrane thickness can be controlled by the quantity of electricity applied in the electrochemical polymerization. When the membrane thickness is less than 0.03 μm, clear contrast cannot be attained, leading to substantial loss of commercial value as a display material. To the contrary, a thickness exceeding 30 μm provides clear contrast but is unfavorable in view of film strength or response speed.

ECD devices can be produced by assembling the thus obtained polymer with an opposing electrode via a liquid electrolyte. The liquid electrolyte which can be used is a dispersion or solution of a supporting electrolyte in a solvent. The supporting electrolyte which can be used in the present invention includes combinations of (i) anions (i.e., $Y^-$ in the formula (III)) such as halide anions of Va group elements, e.g., $PF_6^-$, $SbF_6^-$, $AsF_6^-$ and $SbCl_6^-$; halide anions of IIIa Group series element, e.g., $BF_4^-$; halogen anions, e.g., $I^-(I_3^-)$, $Br^-$ and $Cl^-$; perchloric acid anions, e.g., $ClO_4^-$; and (ii) cations such as alkali metal ions, e.g., $Li^+$, $Na^+$ and $K^+$; quaternary ammonium ions, e.g., $R_4N^+$ (wherein R represents a hydrocarbon residue having 1 to 20 carbon atoms); and phosphonium ions, e.g., $(C_6H_5)_4P^+$, but these combinations are not limitative.

Specific examples of the supporting electrolytes composed of the above-described combinations of anions (X) and cations are $LiPF_6$, $LiSbF_6$, $LiAsF_6$, $LiClO_4$, NaI, $NaPF_6$, $NaSbF_6$, $NaAsF_6$, $NaClO_4$, KI, $KPF_6$, $KSbF_6$, $KAsF_6$, $KClO_4$, $[(n\text{-}Bu)_4N]^+\cdot(AsF_6)^-$, $[(n\text{-}Bu)_4N]^+\cdot(PF_6)^-$, $[(n\text{-}Bu)_4N]^+\cdot ClO_4^-$, $LiAlCl_4$, $LiBF_4$, $(C_6H_5)_4P\cdot BF_4$, $(C_6H_5)_4P\cdot AsF_6$ and $(C_6H_5)_4P\cdot ClO_4$, but these examples are not limitative. These supporting electrolytes may be used individually or in combination of two or more of them if necessary.

$HF_2^-$ anion can also be used in addition to the above-enumerated anions. Further, cations which can be used in addition to the above-enumerated ones include pyrylium or pyridinium cations represented by the following formula (V) and carbonium cations represented by the following formula (VI) or (VII):

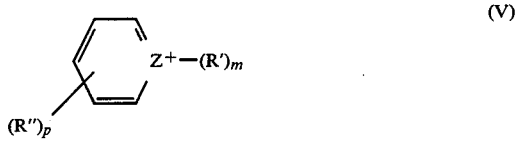

wherein Z represents an oxygen atom or a nitrogen atom; R' represents a hydrogen atom, an alkyl group having 1 to 15 carbon atoms or an aryl group having 6 to 15 carbon atoms; R" represents a halogen atom, an alkyl group having 1 to 10 carbon atoms or an aryl group having 6 to 15 carbon atoms; m is 0 when Z is an oxygen atom, or m is 1 when Z is a nitrogen atom; and p is 0 or an integer of from 1 to 5.

wherein $R^3$, $R^4$ and $R^5$ each represents a hydrogen atom, an alkyl group having 1 to 15 carbon atoms, an allyl group, an aryl group having 6 to 15 carbon atoms or $-OR^7$ wherein $R^7$ represents an alkyl group having 1 to 10 carbon atoms or an aryl group having 6 to 15 carbon atoms, with proviso that $R^3$, $R^4$ and $R^5$ are not hydrogen atoms at the same time; and $R^6$ represents a hydrogen atom, an alkyl group having 1 to 15 carbon atoms or an aryl group having 6 to 15 carbon atoms.

The $HF_2^-$ anion which can be used is usually obtained by dissolving a compound (hydrofluoride) represented by the formula (VIII), (IX) or (X):

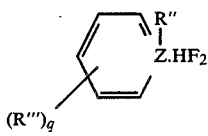 (X)

wherein R' and R" each represents a hydrogen atom, an alkyl group having 1 to 15 carbon atoms or an aryl group having 6 to 15 carbon atoms; R'" represents an alkyl group having 1 to 10 carbon atoms or an aryl group having 6 to 15 carbon atoms; Z represents an oxygen atom or a nitrogen atom; q represents 0 or a positive integer of 5 or less; and M represents an alkali metal, as a supporting electrolyte in an appropriate solvent. Specific examples of the compounds represented by the above formulae (VIII), (IX) and (X) include $H_4N.HF_2$, $Bu_4N.HF_2$, $Na.HF_2$, $K.HF_2$, $Li.HF_2$ and

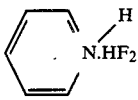

The pyrylium or pyridinium cations represented by the formula (III) can be obtained by dissolving a salt formed between a cation represented by the formula (V) and an anion (X), e.g., $ClO_4^-$, $BF_4^-$, $AlCl_4^-$, $FeCl_4^-$, $SnCl_5^-$, $PF_6^-$, $PCl_6^-$, $SbF_6^-$, $AsF_6^-$, $CF_3SO_3^-$, $HF_2^-$, etc., as a supporting electrolyte in an appropriate solvent. Specific examples of such a salt are:

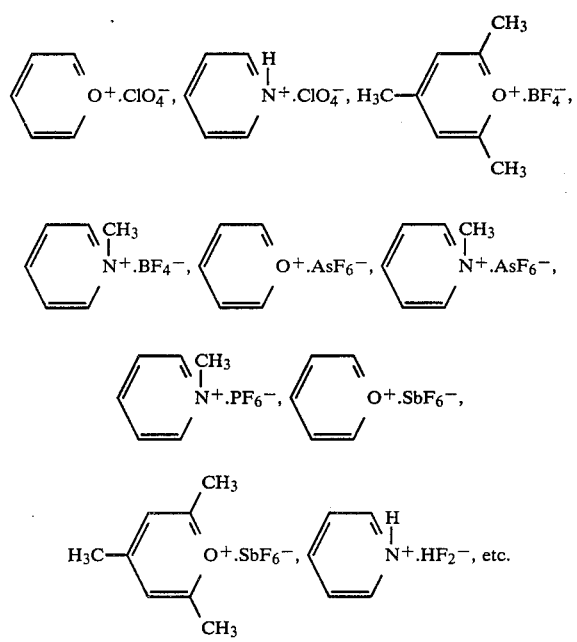

Specific examples of the carbonium cations represented by the above-described formula (VI) or (VII) include $(C_6H_5)_3C^+$, $(CH_3)_3C^+$,

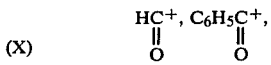

etc.

These carbonium cations can be obtained by dissolving or dispersing a salt formed between such a cation and an anion (X) (i.e., carbonium salt) as a supporting electrolyte in an appropriate solvent. The anion (X) usable typically includes $BF_4^-$, $AlCl_4^-$, $AlBr_3Cl^-$, $FeCl_4^-$, $PF_6^-$, $PCl_6^-$, $SbCl_6^-$, $SbF_6^-$, $ClO_4^-$, $CF_3SO_3^-$, etc., and the carbonium salt specifically includes, for example, $(C_6H_5)_3C.BF_4$, $(CH_3)_3C.BF_4$, $HCO.AlCl_4$, $HCO.BF_4$, $C_6H_5CO.SnCl_5$, etc.

The solvents which can be used in the present invention may be either an aqueous solvent or a non-aqueous solvent, but a solution of the aforesaid supporting electrolyte in a non-aqueous organic solvent is preferred. Preferably, the organic solvents herein used are aprotic and have high dielectric constants. For example, ethers, ketones, nitriles, amines, amides, sulfur compounds, phosphoric ester compounds, phosphorous ester compounds, boric ester compounds, chlorinated hydrocarbons, esters, carbonates, nitro compounds and the like can be employed. Of these, ethers, ketones, nitriles, phosphoric ester compounds, phosphorous ester compounds, boric ester compounds, chlorinated hydrocarbons and carbonates are preferred. Specific examples of these solvents include tetrahydrofuran, 2-methyltetrahydrofuran, 1,4-dioxane, monoglyme, acetonitrile, propionitrile, 4-methyl-2-pentanone, butyronitrile, valeronitrile, benzonitrile, 1,2-dichloroethane, γ-butyrolactone, valerolactone, dimethoxyethane, methylformate, propylene carbonate, ethylene carbonate, dimethylformamide, dimethyl sulfoxide, dimethyl thioformamide, ethyl phosphate, methyl phosphate, ethyl phospite, methyl phosphite, 3-methylsulforan, etc. Among these, nitriles and carbonates are especially preferred in order to increase the response speed.

These organic solvents may be used alone or in combination of two or more of them.

Depending upon the model of ECD devices used or the kind of electrodes used, oxygen or water present in these solvents or protonic solvents sometimes deteriorate performances of the ECD devices. Such being the case, it is preferable to previously purify the solvents in a usual manner. Further, in the ECD devices of the present invention, organic solvents having merely dispersed therein a supporting electrolyte, or an organic solid electrolyte having high ionic conductivity which is composed of polyethylene oxide and NaI, NaSCN, etc. can also be used in addition to the above-described electrolytes.

Concentrations of the supporting electrolyte used in the ECD devices of this invention vary depending on the kind of organic solvents used, current and voltage values of applied electricity, operating temperatures, the kind of supporting electrolytes and the like and, therefore, cannot be generally fixed. The liquid electrolyte may be either homogeneous or heterogeneous, but usually employable concentrations range from 0.001 to 10 mol/l. The distance between the high molecular weight conductive membrane and an opposing electrode cannot be generally determined since it varies depending on the kind of supporting electrolytes, current and voltage values of applied electricity, the display surface area as an ECD device and the like, but it is preferably from 0.05 to 5 mm. Further, as an opposing electrode, a variety of materials can be employed according to the end use. That is, in the case when transmitted light is utilized for displaying, the conductive transparent materials as described above are preferably used as opposing electrodes. On the other hand, in the case of utilizing reflected light, it is also possible to use, as opposing electrodes, opaque conductive materials, such as a metal foil, e.g., nickel or platinum, and gauze. Furthermore, since the ECD devices provide a substantially colorless tone, background plates having various color tones can be selected. Thus, the ECD devices obtained by the present invention can be used in a wide application owing to a wide selection of materials to be used.

The present invention will now be illustrated in greater detail with reference to examples, but it should be understood that the present invention is not limited to these examples.

EXAMPLE XII

In an acetonitrile solution containing 0.08 mol/l of $(C_6H_5)_4$ PCl was dissolved 0.0788 mol/l of 1,3-isothianaphthene (the compound of the formula (IV) wherein $R^1=R^2=H$) to prepare an electrolyte. Electrochemical polymerization was carried out by using the above electrolyte, a glass plate on which indium tin oxide had been vacuum evaporated as a sample electrode, an aluminum plate as a counter electrode at a current density of 2 mA/cm$^2$ at room temperature for 20 minutes. There was obtained an electrochemically lightly doped, deep blue-colored polymer on the indium tin oxide-deposited glass plate anode. The resulting display base was washed with acetonitrile and dried. The dry thickness of the polymer membrane was 10 μm.

The thus produced display base was immersed in a tetrahydrofuran solution containing 0.53 mol/l of LiClO$_4$, and electricity was imposed therethrough using Li as a counterelectrode to determine dependence on applied voltage. The results obtained are shown in FIG. 6. As can be seen from FIG. 6, the polymer had a blue color at 2.50 V (vs. Li electrode) but turned to transparent pale green at 3.50 V. It was also confirmed that this change was reversible.

Figure 7:
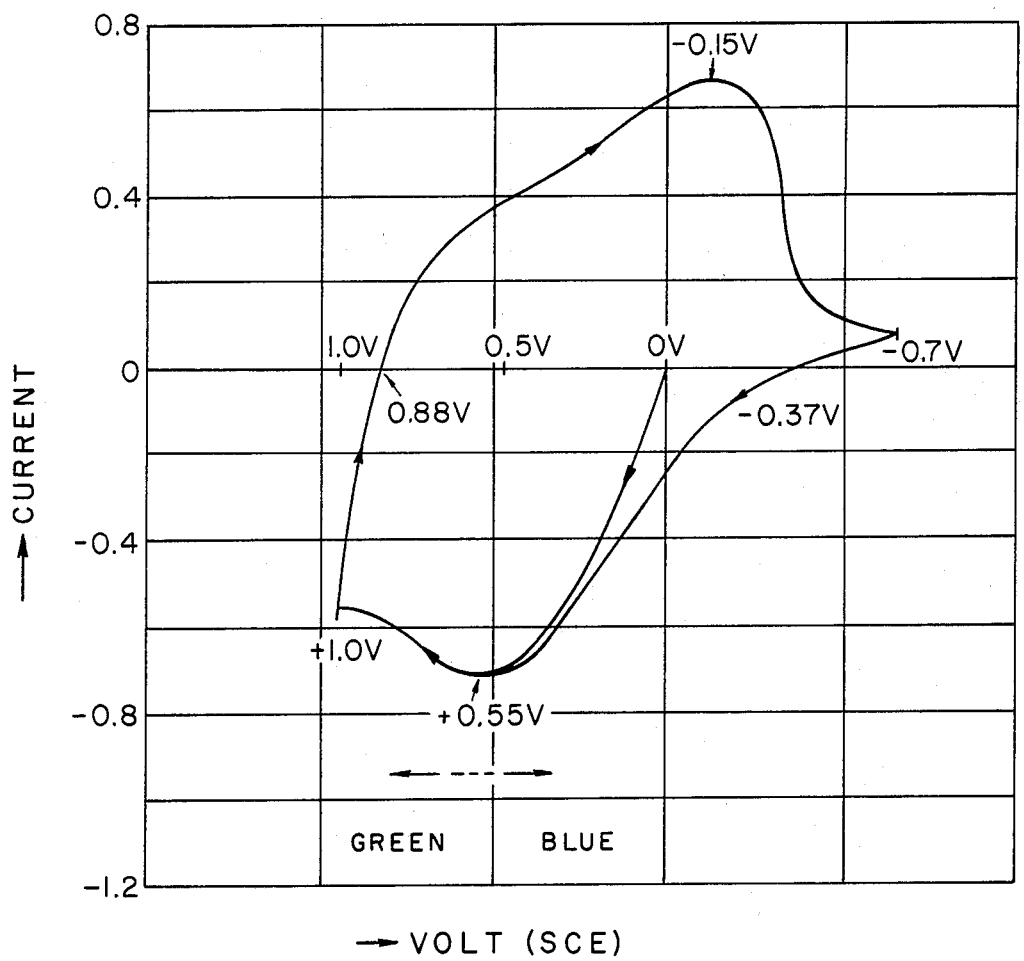
FIG. 7 is a cyclic voltamogram of the high molecular weight conductive membrane according to Example XIV as measured with $(C_4H_9)_4NClO_4$ in acetonitrile as an electrolyte at a voltage of from +1.0 V to −0.7 V. (vs. a standard calomel electrode).

Then, voltammetry was performed using $(C_4H_9)_4$.NClO$_4$ as an electrolyte in acetonitrile at an applied voltage of from $-0.7$ V to $+1.0$ V (vs. a standard calomel electrode). The results obtained are shown in FIG. 7. It can be seen from FIG. 7 that the polymer film had a deep blue color at a voltage of from $+0.6$ V to $-0.7$ V and changed to a highly transparent pale green color at a voltage of from $+0.6$ to $+1.0$ V.

Figure 8:
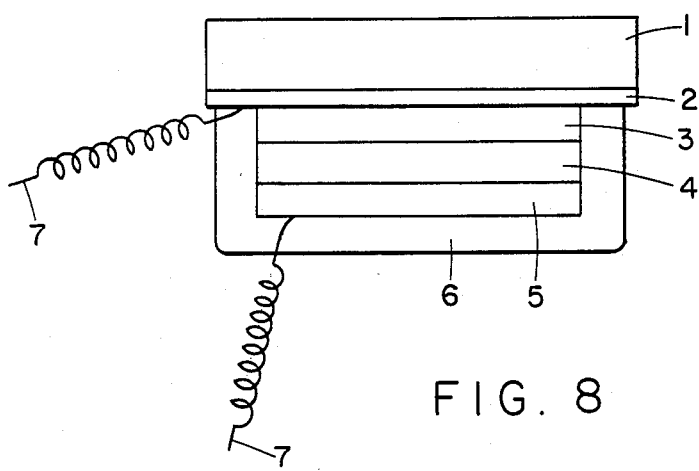
FIG. 8 is a schematic cross-sectional view illustrating an example of the ECD device according to the present invention. In this figure, the numeral 1 represents a transparent glass base; 2, a display electrode; 3, an electrochromic material; 4, a liquid electrode; 5, an opposing electrode; 6, a protecting layer; and 7, lead-in wires, respectively.

According to these results, an ECD device as shown in FIG. 8 was produced, and a propylene carbonate solution containing 0.53 mol/l of LiBF$_4$ was incorporated therein as a liquid electrolyte and then sealed. Square waves of $+0.8$ V to $-0.4$ V were applied to the ECD device at a frequency of 1 Hz to effect a durability test. As a result, no deterioration of the electrochromic material was observed even after $2\times10^4$ times of coloring and discoloring operations.

Having fully described tho invention, it is intended that it is to be limited only by the lawful scope of the appended claims.

We claim:

1. A poly(isothianaphthene) polymer having a structural formula selected from the group consisting of (Ia) and (Ib) wherein:

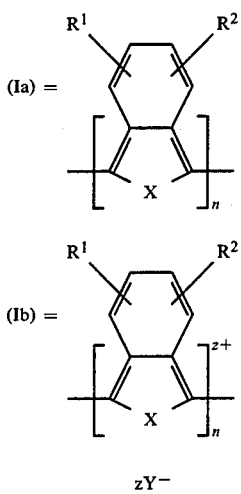

and wherein said $R^1$ and $R^2$ are selected independently from the group consisting of hydrogen atoms and hydrocarbon residues having 1 to 5 carbon atoms, with the proviso that said $R^1$ and $R^2$ may link together to form, along with the benzene ring, a fused ring which is naphthalene; said X is selected from the group consisting of sulfur, selenium and tellurium; said $Y^-$ represents an anion of an electrolyte; said z represents a number from 0.01 to 1 showing a ratio of the anion per mol of a monomer; and said n represents a number of from 5 to 500 showing a degree of polymerization.

2. The polymer of claim 1 having the structure of formula (Ia).

3. The polymer of claim 2 wherein X is sulfur.

4. The polymer of claim 3 wherein both $R^1$ and $R^2$ are hydrogen.

5. The polymer of claim 3 wherein $R^1$ and $R^2$ are selected independently from the group consisting of hydrogen, methyl and ethyl.

6. The polymer of claim 2 wherein $R^1$ and $R^2$ are selected independently from the group consisting of hydrogen, methyl, methoxy and thiomethyl.

7. The polymer of claim 6 wherein X is sulfur.

8. The polymer of claim 1 having the structure of formula (Ib).

9. The polymer of claim 8 wherein X is sulfur.

10. The polymer of claim 9 wherein $R^1$ and $R^2$ are both hydrogen.

11. The polymer of claim 9 wherein $R^1$ and $R^2$ are selected indpendently from the group consisting of hydrogen, methyl and ethyl.

12. The polymer of claim 8 wherein $R^1$ and $R^2$ are selected independently from the group consisting of hydrogen, methyl, methoxy and thiomethoxy.

13. The polymer of claim 12 wherein X is sulfur.

14. The polymer of claim 8 wherein $Y^-$ is selected from the group consisting of $Cl^-$, $Br^-$, $I^-$, $ClO_4^-$, $BF_4^-$, $PF_6^-$, $AsF_6^-$, $SbF_6^-$, $AlCl_4^-$, $AlBr_4^-$, $FeCl_4^-$, and $CF_3SO_3^-$.

15. The polymer of claim 9 wherein $Y-$ is selected from the group consisting of $Cl^-$, $Br^-$, $I^-$, $ClO_4^-$, $BF_4^-$, $PF_6^-$, $AsF_6^-$, $SbF_6^-$, $AlCl_4^-$, $AlBr_4^-$, $FeCl_4^-$, and $CF_3SO_3^-$.

16. The polymer of claim 10 wherein Y− is selected from the group consisting of Cl−, Br−, I−, ClO4−, Bf4−, PF6−, AsF6−, SbF6−, AlCl4−, AlBr4−, FeCl4−, and CF3SO3−.

17. The polymer of claim 11 wherein Y− is selected from the group consisting of Cl−, Br−, I−, ClO4−, BF4−, PF6−, AsF6−, SbF6−, AlCl4−, AlBr4−, FeCl4−, and CF3SO3−.

18. The polymer of claim 12 wherein Y− is selected from the group consisting of Cl−, Br−, I−, ClO4−, BF4−, PF6−, AsF6−, SbF6−, AlCl4−, AlBr4−, FeCl4−, and CF3SO3−.

19. The polymer of claim 8 wherein Y− is HSO4−.
20. The polymer of claim 9 wherein Y− is HSO4−.
21. The polymer of claim 10 wherein Y− is HSO4−.
22. The polymer of claim 11 wherein Y− is HSO4−.
23. The polymer of claim 12 wherein Y− is HSO4−.

24. A method of preparing a poly(isothianaphthene) polymer by electrochemical polymerization comprising:
(a) providing a monomer having the formula:

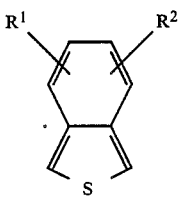

wherein said R$^1$ and R$^2$ are selected independently from the group consisting of hydrogen and hydrocarbon residues having 1 to 5 carbon atoms, with the proviso that R$^1$ and R$^2$ may link together, along with the benzene ring, to form a fused ring which is napthalene;
(b) disolving said monomer in an aprotic solvent containing electrolyte to provide a monomer solution, said electrolyte being ionic and a source of nucleophilic anions; and
(c) electrochemically polymerizing said monomer solution to provide a poly(isothianaphthene).

25. The method of claim 24 wherein said monomer is 1,3-isothianaphthene.

26. The method of claim 24 wherein said polymerization forms said poly(isothianaphthene) into a membrane on a transparent conductive base.

27. The method of claim 25 wherein said polymerization forms said poly(isothianaphthene) into a membrane on a transparent conductive base.

28. A method of preparing a poly(isothianaphthene) polymer of chemical polymerization comprising:
(a) providing a monomer having the formula:

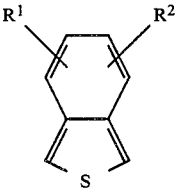

wherein said R$^1$ and R$^2$ are selected independently from the group consisting of hydrogen and hydrocarbon residues having 1 to 5 carbon atoms, with the proviso that R$^1$ and R$^2$ may link together, along with the benzene ring, to form a fused ring which is napthalene;
(b) polymerizing said monomer by contacting said monomer with a cationic polymerization catalyst whereby a poly(dihydroisothianaphthene) polymer is formed; and
(c) dehydrogenating said poly(dihydroisothianaphthene) polymer by contact with an oxidizing agent to form a poly(isothianaphthene) polymer.

29. The method of claim 28 wherein said monomer is 1,3-isothianaphthene.

30. The method of claim 28 wherein said monomer is polymerized in a solvent.

31. The method of claim 29 wherein said monomer is polymerized in a solvent.

32. A method of preparing a poly(isothianaphthene) polymer comprising:
(a) providing a monomer having the formula:

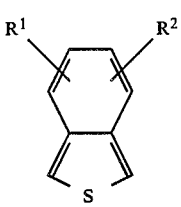

wherein said R$^1$ and R$^2$ are selected independently from the group consisting of hydrogen and hydrocarbon residues having 1 to 5 carbon atoms, with the proviso that R$^1$ and R$^2$ may link together, along with the benzene ring, to form a fused ring which is napthalene; and
(b) polymerizing said monomer by contacting said monomer with an oxidative polymerization catalyst whereby a poly(isothianaphthene) polymer is formed.

33. The method of claim 32 wherein said oxidative polymerization catalyst is a Friedel-Crafts catalyst.

34. The method of claim 32 wherein said oxidative polymerization catalyst is sulfuric acid.

35. The method of claim 32 wherein said oxidative polymerization catalyst is 7,7,8,8-tetracyanoquinodimethane.

36. The method of claim 32 wherein said monomer is 1,3-isothianaphthene.

37. The method of claim 33 wherein said monomer is 1,3-isothianaphthene.

38. The method of claim 34 whrein said monomer is 1,3-isothianaphthene.

39. The method of claim 35 wherein said monomer is 1,3-isothianaphthene.

40. A method of preparing a poly(isothianaphthene) polymer comprising:
(a) providing a monomer having the formula:

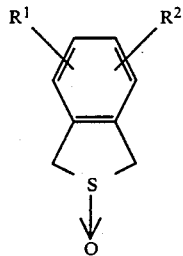

wherein said $R^1$ and $R^2$ are selected independently from the group consisting of hydrogen and hydrocarbon residues having 1 to 5 carbon atoms, with the proviso that $R^1$ and $R^2$ may link together, along with the benzene ring, to form a fused ring which is naphthalene; and (b) polymerizing said monomer by dissolving said monomer in a dehydrating and oxidizing solvent whereby a poly(isothianaphthene) polymer is formed.

41. The method of claim 40 wherein said solvent is selected from the group consisting of sulfuric acid and polyphosphoric acid.

42. The method of claim 41 wherein said monomer is 1,3-dihydroisothianaphthene.

* * * * *